US007680943B2

(12) United States Patent
Conta et al.

(10) Patent No.: US 7,680,943 B2
(45) Date of Patent: Mar. 16, 2010

(54) METHODS AND APPARATUS FOR IMPLEMENTING MULTIPLE TYPES OF NETWORK TUNNELING IN A UNIFORM MANNER

(75) Inventors: Alex Conta, Stamford, CT (US); Srihari Varada, Shelton, CT (US)

(73) Assignee: Transwitch Corporation, Shelton, CT (US)

( * ) Notice: Subject to any disclaimer, the term of this patent is extended or adjusted under 35 U.S.C. 154(b) by 1804 days.

(21) Appl. No.: 10/691,109

(22) Filed: Oct. 20, 2003

(65) Prior Publication Data

US 2005/0086367 A1 Apr. 21, 2005

(51) Int. Cl.
*G06F 15/16* (2006.01)
*G06F 15/173* (2006.01)
(52) U.S. Cl. .................... 709/230; 709/227
(58) Field of Classification Search ............... 709/227, 709/228, 238, 244, 246, 249, 230
See application file for complete search history.

(56) References Cited

U.S. PATENT DOCUMENTS

| 5,864,666 | A * | 1/1999 | Shrader ..................... 726/15 |
| 6,339,595 | B1 * | 1/2002 | Rekhter et al. ............. 370/392 |
| 6,636,498 | B1 * | 10/2003 | Leung ........................ 370/338 |
| 6,873,627 | B1 * | 3/2005 | Miller et al. ................ 370/466 |
| 6,920,503 | B1 * | 7/2005 | Nanji et al. ................. 709/230 |
| 6,977,932 | B1 * | 12/2005 | Hauck ........................ 370/392 |
| 7,111,065 | B2 * | 9/2006 | Davidson et al. ........... 709/227 |
| 2002/0016926 | A1 * | 2/2002 | Nguyen et al. ............. 713/201 |
| 2002/0178355 | A1 * | 11/2002 | D'Sa et al. ................. 713/156 |
| 2003/0200307 | A1 * | 10/2003 | Raju et al. ................... 709/224 |
| 2004/0148428 | A1 * | 7/2004 | Tsirtsis ....................... 709/238 |
| 2005/0086367 | A1 * | 4/2005 | Conta et al. ................ 709/238 |
| 2005/0129001 | A1 * | 6/2005 | Backman et al. ........... 370/352 |

OTHER PUBLICATIONS

Greaves D. J., "CBG Orangepath: Automated Design of Data Transfer Protocols", Jan. 2003, http://www.cl.cam.ac.uk/~djg11/wwwhpr/dsprotocol.html.*
"Multiprotocol Label Switching Architecture", Rosen, et al.; Jan. 2001 The Internet Society.
"MPLS Label Stack Encoding", Rosen et al., Jan. 2001; The Internet Society.
Layer Two Tunneling Protocol "L2TP", Townsley et al., Aug. 1999; The Internet Society.
"IP Encapsulation Within IP", Perkins et al.; Oct. 1996.
"Generic Packet Tunneling in Ipv6 Specification"; Conta & Deering; Dec. 1998; The Internet Society.

* cited by examiner

*Primary Examiner*—Larry D Donaghue
*Assistant Examiner*—Brian J Gillis
(74) *Attorney, Agent, or Firm*—Gordon & Jacobson, PC

(57) ABSTRACT

A uniform method for implementing multiple tunneling protocols in a switch or router is disclosed. The method is based on the realization that although the tunneling protocols are very different, they do share a similar overall structure which can be exploited to create a unified method of dealing with multiple protocols. By using similar data structures to implement multiple protocols, the invention makes data management and programming simple and, therefore, cost effective. According to the invention, all tunneling protocols are abstracted as the mapping of input L2 or L3 streams with output L2 or L3 streams. Mapping is provided by a finite set of tunnel interfaces. The tunnel interfaces map the input streams to output interfaces. As traffic streams flow through these interfaces, they are processed according to defined attributes of these interfaces.

39 Claims, 5 Drawing Sheets

| Protocol | IP over IP | L2TP | IP over MPLS | Ethernet over MPLS |
|---|---|---|---|---|
| Input Interface | IP interface | PPP Interface | IP Interface | Ethernet Interface |
| Input Information Base | FIB | Tunnel & Session Information Base (TSIB) | FIB | Switching Information Base (SIB) |
| Mapping Transmit Interface | IP in IP *Transmit* Interface | L2TP *Transmit* Interface | MPLS *Transmit* Interface | MPLS *Transmit* Interface |
| Mapping Information Base | FIB, or none | FIB, or none | none | none |
| Output Interface | IP or L2 interface | IP or L2 Interface | L2 Interface | L2 interface |

Figure 4

| Protocol | IP over IP | L2TP | IP over MPLS | Ethernet over MPLS |
|---|---|---|---|---|
| Input Interface | IP interface | IP Interface | MPLS Interface | MPLS Interface |
| Input Information Base | FIB | FIB | LIB | LIB |
| Mapping Receive Interface | IP in IP *Receive* Tunnel Interface | L2TP *Receive* Tunnel Interface | IP Interface | Ethernet Interface |
| Mapping Information Base | FIB | Tunnel & Session Information Base (TSIB) | FIB | Switching Information Base SIB |
| Output Interface | IP or L2 interface | PPP Interface | IP or L2 Interface | Ethernet interface |

Figure 5

METHODS AND APPARATUS FOR IMPLEMENTING MULTIPLE TYPES OF NETWORK TUNNELING IN A UNIFORM MANNER

BACKGROUND OF THE INVENTION

1. Field of the Invention

The invention relates to datacommunications. More particularly, the invention relates to methods and apparatus for tunneling different types of data packets over different types of networks.

2. State of the Art

Tunneling is a process whereby a data packet is encapsulated in another packet before traversing a network. There are two primary uses for tunneling. One use is to transport one type of packet over a network designed for another type of packet, e.g. Ethernet over ATM. Another application for tunneling is referred to as Virtual Private Networking, a process whereby a secure encrypted (or non-secure) connection is created across a public network through the use of tunneling.

Currently there are a wide variety of tunneling protocols. Some are platform and/or network dependent. Among the most popular protocols are: IP (Internet Protocol) over IP, IP over MPLS (multiprotocol label switching), Ethernet over MPLS, and L2TP (layer two tunneling protocol).

A Virtual Private Network (VPN) consists of two or more nodes connected by "virtual links", i.e. tunnels, through a public network such as the Internet. From the point of view of the nodes, the tunnel operates as a point to point link and the tunneling protocol operates as a link layer protocol.

By definition, a tunnel exists between two nodes. One node is referred to as the entry node and the other is referred to as the exit node. A tunnel is unidirectional. Bi-directional tunneling is achieved by pairing two tunnels. These are referred to as the "direct tunnel" and the "reverse tunnel". The two tunnels may traverse different nodes in the network or the tunnels may be symmetrical, i.e. traverse the same nodes in both directions.

Generally speaking, the tunneling process involves the processing of headers attached to data packets. For example, at the entry node one or more tunnel headers are pre-pended to the data packet. As the packet traverses the tunnel, intermediate nodes in the tunnel process the packet according to the tunneling protocol. For example, in IP over IP tunneling, intermediate nodes perform IP header processing and IP packet forwarding. In an MPLS tunnel, intermediate nodes perform MPLS label processing and MPLS packet forwarding. At the exit node, destination node processing is performed. For example, in an IP over IP tunnel, the exit node reassembles IP packet fragments and processes the reassembled packets according to their original (inner) headers. The processing of headers or other packet information is performed with the aid of a database. The header information is used as a key to lookup a matching entry in the database to yield an output port. The following is a more detailed explanation of how IP, MPLS, and L2TP tunneling operate.

IP over IP Tunneling

Each node in an IP tunnel maintains a "Forwarding Information Base" (FIB) which contains a plurality of entries. Each entry includes an IP address of a host or an IP prefix of one or more networks as well as information about the "Next Hop Routers" through which the destination host or network can be reached. (As used herein, the term router is meant to include switches as well as routers.) The Next Hop information consists of an IP address of the Next Hop router, the IP interface on which the Next Hop Router is reachable, and possibly more information such as a Layer 2 address. The FIB entries are typically built based on routing information disseminated dynamically by IP Routing Protocols. However, entries can also be built based on information statically configured into the router. Some routers may have multiple FIB.

IP packet forwarding is performed hop by hop. Each router in the tunnel uses the FIB information to find the best possible Next Hop router to forward an IP packet on its way to the final destination. The identity of the best possible Next Hop Router for forwarding an IP packet is determined by comparing the packet's destination IP address with the IP addresses and prefixes in the FIB. The FIB entry having the IP address or prefix which matches or most closely matches the destination IP address of the packet identifies the best possible Next Hop router. This comparison is referred to as the Longest Prefix Match. The Longest Prefix Match yields an output "IP interface" which is used to forward the packet.

The "IP interface" (IF) is an abstraction of the IP functions on a physical or logical port of a router or switch. It leads to the identification of the egress port through the binding relation with the Layer 2 interface and performs the needed IP functions to pass the packet through the port. The IF is usually configured by the router operator with information which is relevant to the IP protocol processing performed by the router.

Each router used in IP over IP tunneling also maintains an "IP Tunnel Interface" (TIF) for each tunnel serviced by the router. The TIF is an abstraction of IP over IP tunnel functions on a physical or logical port of a router. It identifies the entry and exit nodes for the tunnel. Usually, it is configured by the router operator.

Tunnels may be static or dynamic. A static tunnel uses the same set of routers and takes the same route through the network all the time. A dynamic tunnel can take different routes through the network based on network conditions or tunnel programming. Most IP tunnels are dynamic and use the best route available based on network congestion or time of day.

When a packet reaches its final destination, the exit node router strips the tunnel header(s) from the packet. The remaining inner header is an IP header, and therefore, the packet is passed to an IP processing engine which performs an IP lookup on the inner IP header, i.e. the IP destination address. This lookup may yield an outgoing interface, if the packet is to be forwarded, or may indicate local consumption, if the router itself is the final destination. The router itself may be the final destination when the packet contains command/control information.

MPLS Tunneling

The key concept in MPLS tunneling is identifying and marking packets with labels and forwarding them to a router which then uses the labels to forward the packets through the network. The labels are created and assigned to packets by a Label Distribution Protocol (LDP) based upon the information gathered from existing routing protocols or some other method.

An MPLS tunnel includes a plurality of interconnected Label Switch Routers (LSRs). At least some of the LSRs are coupled to Label Edge Routers (LERs). An MPLS tunnel is also referred to as a Label Switched Path (LSP) from an input LER through LSRs to an output LER. When a packet arrives at an LER, the LER extracts the datagram (the data portion of a packet) and the routing information from the packet and assigns a label to the datagram based on routing information.

The datagram with the label is then sent to an LSR based on the label. The LSR which receives the datagram forwards it on through the network based on the label.

An LSP is a set of LSRs that packets belonging to a certain FEC (forwarding equivalence class) travel in order to reach their destination. Each LER in an MPLS tunnel (LSP) has an Incoming Label Map (ILM). The ILM specifies the action to take when a labeled packet is received. Each entry defines an incoming label, a label operation, and a link to a Next Hop Label Forwarding Entry (NHLFE). The ILM is built based on label distribution information disseminated by a Label Distribution Protocol (LDP) engine.

Each LER in the MPLS tunnel (LSP) has an FEC-to-NHLFE Map (FTN). The FTN specifies the action to take when an unlabeled packet is received. Each entry in the FTN defines a set of characteristics used to categorize the packet, and a link to an NHLFE. The FTN is also built based on information disseminated by a Label Distribution Protocol (LDP) engine.

An NHLFE specifies "how to" forward a packet. It defines an outgoing label, a label operation, a next hop IP address, and an output interface. It may also specify an MPLS label stack. The label stack identifies a series of labels to push on a labeled packet in the process of forwarding the packet on an LSP segment. The NHLFE is built based on label distribution information disseminated by a Label Distribution Protocol (LDP) engine.

Simple label forwarding is realized by pointing an ILM entry to an NHLFE, and applying a label swap. This is referred to as the MPLS label swapping/forwarding function. An LSP is originated by pointing an FTN entry to a NHLFE, and applying a label push. This is referred to as the LSP entry function. An LSP is terminated by not pointing an ILM entry to any NHLFE, and applying a label pop at input. Terminating the LSP does not guarantee that the packet will be consumed by the local node. The packet is forwarded using the exposed label or IP header. The collection of ILMs and related NHLFEs are collectively called the MPLS Label Information Base or LIB.

L2TP Tunneling

The L2TP (layer two tunneling protocol) is an extension to PPP (point-to-point protocol) that enables ISPs to operate Virtual Private Networks (VPNs). L2TP works with UDP (user datagram protocol) and IP drivers. L2TP uses a "tunnel list" which is analogous to an MPLS LIB. When a packet is received front a PPP link, part of the PPP header is stripped off and replaced with an L2TP header which includes tunnel and session IDs. The packet is sent to an L2TP tunnel by writing to a UDP driver with IP interface data and the end point IP address. At the end of the tunnel, data is read from a UDP port. The tunnel ID, session ID, and packet flags are extracted. The data is then formatted and written to a PPP link associated with the session. L2TP provides a "one hop" virtual PPP link which spans a multi-hop IP path.

From the foregoing it will be appreciated that the different tunneling protocols process packets in very different ways. State of the art routers which are intended to support different types of tunneling have separate processing engines for each supported tunneling protocol. Depending on the number of tunneling protocols to be implemented, the router may not be cost effective from the perspective of resources, design time and maintainability.

SUMMARY OF THE INVENTION

It is therefore an object of the invention to implement multiple tunneling protocols in a switch or router.

It is also an object of the invention to implement multiple tunneling protocols in a switch or router in a cost effective way.

It is another object of the invention to implement multiple tunneling protocols in a switch or router using the fewest possible resources.

It is still another object of the invention to implement multiple tunneling protocols in a switch or router with efficient design time.

It is also an object of the invention to implement multiple tunneling protocols in a switch or router which is easy to maintain.

Another object of the invention is to implement multiple tunneling protocols in a switch or router using a single general processing engine.

In accord with these objects which will be discussed in detail below, the present invention provides a uniform method for implementing multiple tunneling protocols in a switch or router. The invention is based on the realization that although the tunneling protocols are very different, they do share a similar overall structure which can be exploited to create a unified method of dealing with multiple protocols. By using similar data structures to implement multiple protocols, the invention makes data management and programming simple and, therefore, cost effective.

According to the invention, all tunneling protocols are abstracted as the mapping of input L2 or L3 streams with output L2 or L3 streams. An L2 or L3 interface is an abstraction of a physical or logical port in a router. According to the invention, mapping is provided by a finite set of tunnel interfaces. Each tunnel interface is a logical entity that is characterized by a set of tunnel specific attributes; these attributes include, for example, the parameters identifying tunnel end points. At the tunnel origination or termination point in the network, incoming streams arriving on an input port are mapped to tunnel interfaces. The tunnel interfaces, in turn, map the streams to output interfaces. As traffic streams flow through these interfaces, they are processed according to defined attributes of these interfaces. The interface attributes are tunnel end-point specific (i.e., start or end of a tunnel). Mapping is performed by using context data in an arriving packet as a search key to a database.

At tunnel origination, e.g., the tunnel entry-point node, for all types of tunnels considered by this invention, a first database lookup identifies a tunnel interface appropriate for the packet processing. Once the tunnel interface is selected, the processing continues according to information associated with the tunnel interface. In the case where the tunnel is layered over IP, there are two options. In the first option, the output interface information is cached. Caching the output interface information requires a refresh, in case forwarding information base updating results in changing the path to a different next hop router. In the second option, a second database lookup is employed, on an FIB associated with the tunnel interface, to find the best choice for the outgoing IP interface. In cases where applicable and necessary, IP segmentation and re-assembly of packets is performed to meet the MTU (maximum transmission unit) requirements of the interface.

At tunnel termination, e.g., the tunnel exit-point node, for all types of tunnels considered by this invention, a first database lookup identifies the end of the tunnel and an interface associated with the type of processing of the inner header remaining after tunnel header decapsulation. The inner header of the packet, and a database associated with the interface identified by the first database lookup may be used to perform a second lookup, yielding the outgoing interface for the packet.

The methods of the invention provide similar structuring of processing engines for all supported tunneling protocols. For example, for each supported protocol, the invention provides an input interface, an output interface, an information base, a mapping tunnel interface and a mapping information base.

The invention also provides an API for programming the host processor of a router or switch to perform the methods of the invention.

Additional objects and advantages of the invention will become apparent to those skilled in the art upon reference to the detailed description taken in conjunction with the provided figures.

BRIEF DESCRIPTION OF THE DRAWINGS

FIG. 4 is a table comparing the interfaces and information databases for the transmit side of four types of tunnels; and FIG. 5 is a table comparing the interfaces and information databases for the receive side of four types of tunnels.

BRIEF DESCRIPTION OF THE APPENDIX

The attached CDROM appendix includes a source code description of an API useful for implementing the methods of the invention.

DETAILED DESCRIPTION OF THE PREFERRED EMBODIMENTS

Figure 1:
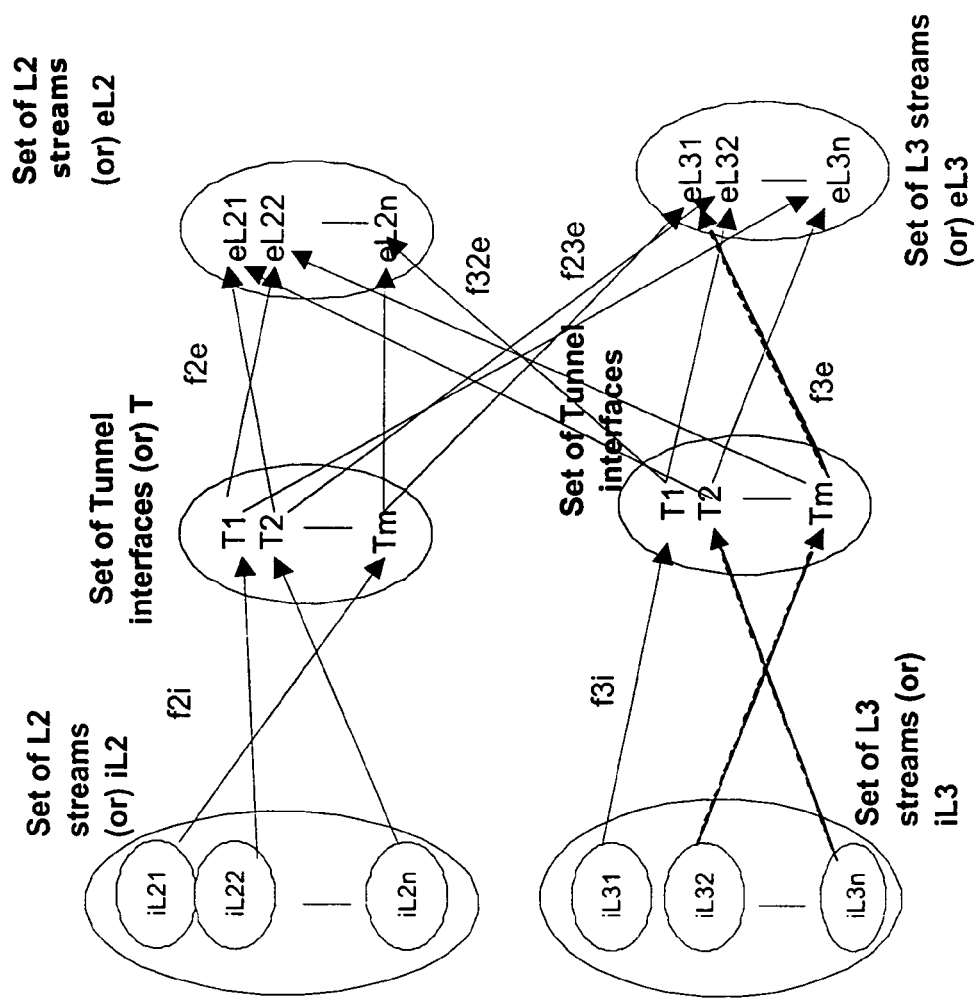
FIG. 1 is a high level schematic diagram illustrating the mapping of input, output and tunnel interfaces according to the invention.

Referring now to FIG. 1, input and output streams are mapped to tunnel interfaces as relational sets. More particularly, input L2 streams iL21-iL2n are treated separately from input L3 streams iL31-iL3n. Separate sets of tunnel interfaces T1-Tm are provided for the L2 and L3 traffic. Output L2 streams eL21-eL2n are treated separately from output L3 streams eL31-eL3n. However, as seen in FIG. 1, streams that enter the router as L2 may exit as L3 streams and vice versa. As shown in FIG. 1, input L2 streams are mapped to tunnel interfaces T by forwarding function f2$i$ and input L3 streams are mapped to tunnel interfaces T by forwarding function f3$i$. L2 tunnel interfaces are mapped to L2 output interfaces eL21-eL2n by forwarding function f2$e$ and L3 tunnel interfaces are mapped to L3 output streams by forwarding function f3$e$. Forwarding function f23$e$ maps input L2 streams from their tunnel interface to an output L3 stream and forwarding function f32$e$ maps input L3 streams from their tunnel interface to an output L2 interface.

The relationship of the streams and interfaces shown in FIG. 1 can be described as a relationship between sets as defined by the forwarding functions. For example:

F2$i$: iL2 maps to T, given iL2 and T don't belong to null sets;
F2$e$: T maps to eL2, given T and eL2 don't belong to null sets;
F23$e$: T maps to eL3, given T and eL3 don't belong to null sets;
F3$i$: iL3 maps to T, given iL3 and T don't belong to null sets;
F3$e$: T maps to eL3, given T and eL3 don't belong to null sets; and
F32$e$: T maps to eL2; given T and eL2 don't belong to null sets.

The mapping (forwarding function) is performed with the aid of context data that a packet (unit of traffic in a stream) carries or is associated with and database information which is configured and updated by a local host.

Figure 2:
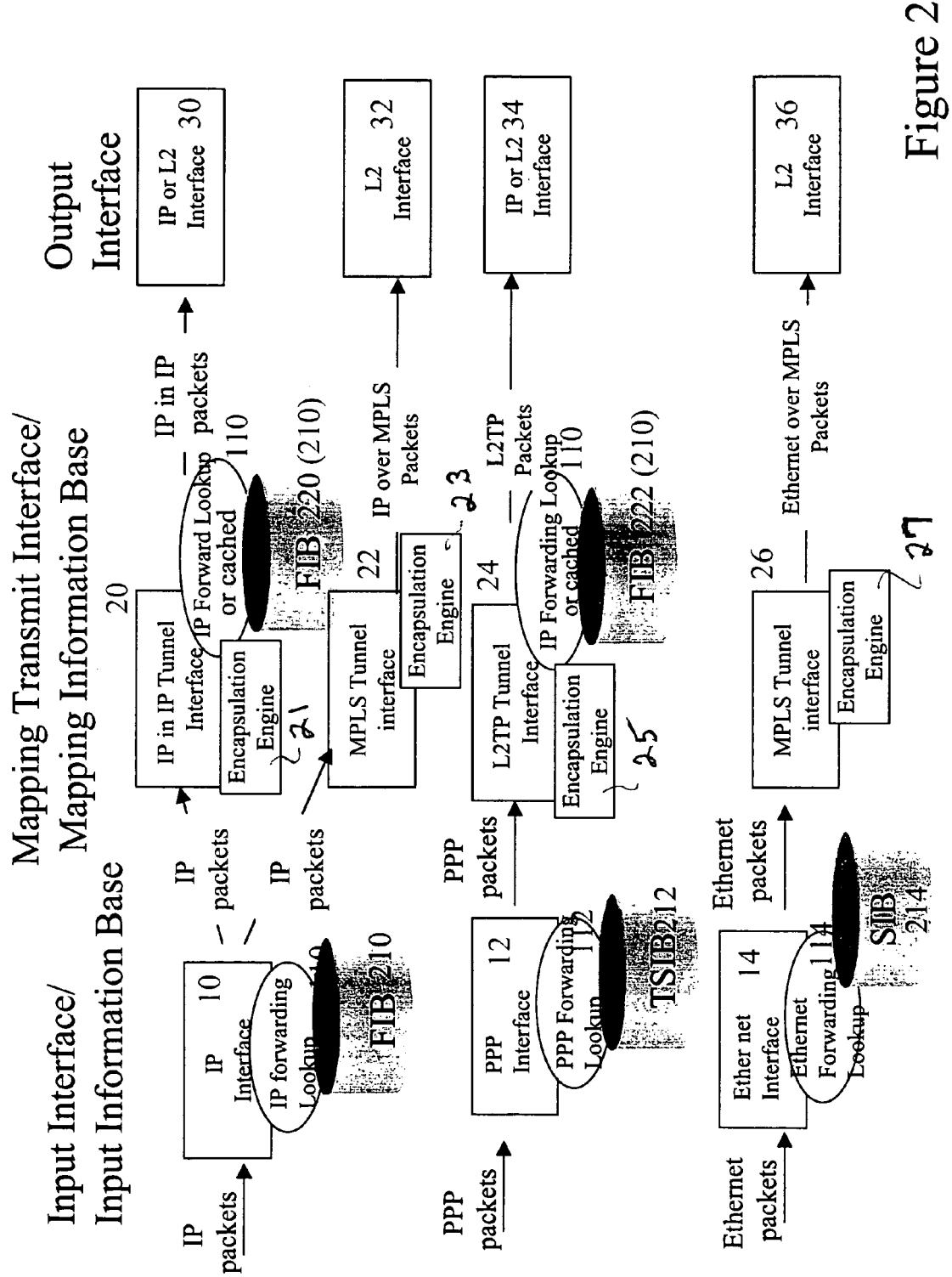
FIG. 2 is a high level schematic diagram illustrating tunnel origination processing according to the invention.

Turning now to FIG. 2, the tunnel origination processing according to the invention is illustrated with respect to input and output L2 and L3 interfaces, tunnel interfaces, associated databases, and forwarding functions (data base lookups). As an IP packet arrives from an IP interface 10, its destination address is retrieved and used as search key by the forwarding function IP forwarding Lookup 110 to find the longest prefix match in the forwarding information base FIB 210. The forwarding information base lookup yields a particular tunnel interface, e.g. IP in IP tunnel interface 20 or MPLS tunnel interface 22. The tunnel interface points to either an L3 interface 30 or an L2 interface 32.

In the case of IP in IP tunneling, an IP header (the tunnel header) is constructed based on information held in the tunnel interface 20. The IP header is prepended to the packet by the encapsulation engine 21. If the IP output information is cached, the tunnel interface 20 will provide the information pointing to output interface 30, and the packet will be forwarded directly to that interface. If output interface caching is not used, the tunnel interface 20 provides an association with an FIB. This FIB can be an FIB 220 specific to this interface, or it can be the FIB 210 used by all IP interfaces 10. The L3 processing employs an IP lookup mechanism 110 to search this FIB. The IP header information from the tunnel header is used in this search. This lookup yields the output interface 30 to which the packet is forwarded.

In the case of IP over MPLS, an MPLS header (tunnel header) is prepended to the packet based on information held in the tunnel interface 22. The tunnel interface 22 provides the Output Label, or a stack of Output Labels, that are stored in this header by the encapsulation engine 23. The resulting packets are then forwarded to the L2 Interface 32.

When packets arrive at PPP interface 12, the PPP context information is used as a search key by the PPP forwarding lookup 112 into the TSIB (tunnel session information base) 212. This yields an L2TP tunnel interface 24 which points to an L3 output interface 34.

In the case of L2TP tunneling, a set of headers, collectively called the L2TP header, is created based on information from the L2TP tunnel interface 24 and are prepended to the packet by the encapsulation engine 25. If the L3 (IP) or L2 output interface information is cached, the L2TP tunnel interface 24 will provide the information pointing to that output interface 34. If output interface caching is not used, the L2TP tunnel interface 24 provides an association to the FIB 222, which the L3 forwarding engine IP lookup 110 will search. The L2TP interface may have its own FIB 222 or there may be only one FIB 210 in the entire system.

When Ethernet packets arrive at the Ethernet interface 14, the Ethernet MAC and/or VLAN tag is retrieved and used as search key by the Ethernet forwarding lookup 114 to search the switching information base SIB 214. This points to an MPLS tunnel interface 26 which points to an L2 interface 36. The MPLS tunnel interface 26 provides the Output Label or a Stack of Labels, which are filled out in the MPLS header prepended to the packet by the encapsulation engine 27. The resulting packets are forwarded to the output L2 Interface 36.

As shown in FIG. 2, the tunnel interfaces are marked "IP in IP Tunnel Interface", "MPLS Tunnel Interface" (for IP), "L2TP Tunnel Interface", and "MPLS Tunnel Interface" (for Ethernet). these are just the "type" of interfaces, but for each type, there can be many interfaces, for example many "IP in IP", or many "MPLS" interfaces.

Figure 3:
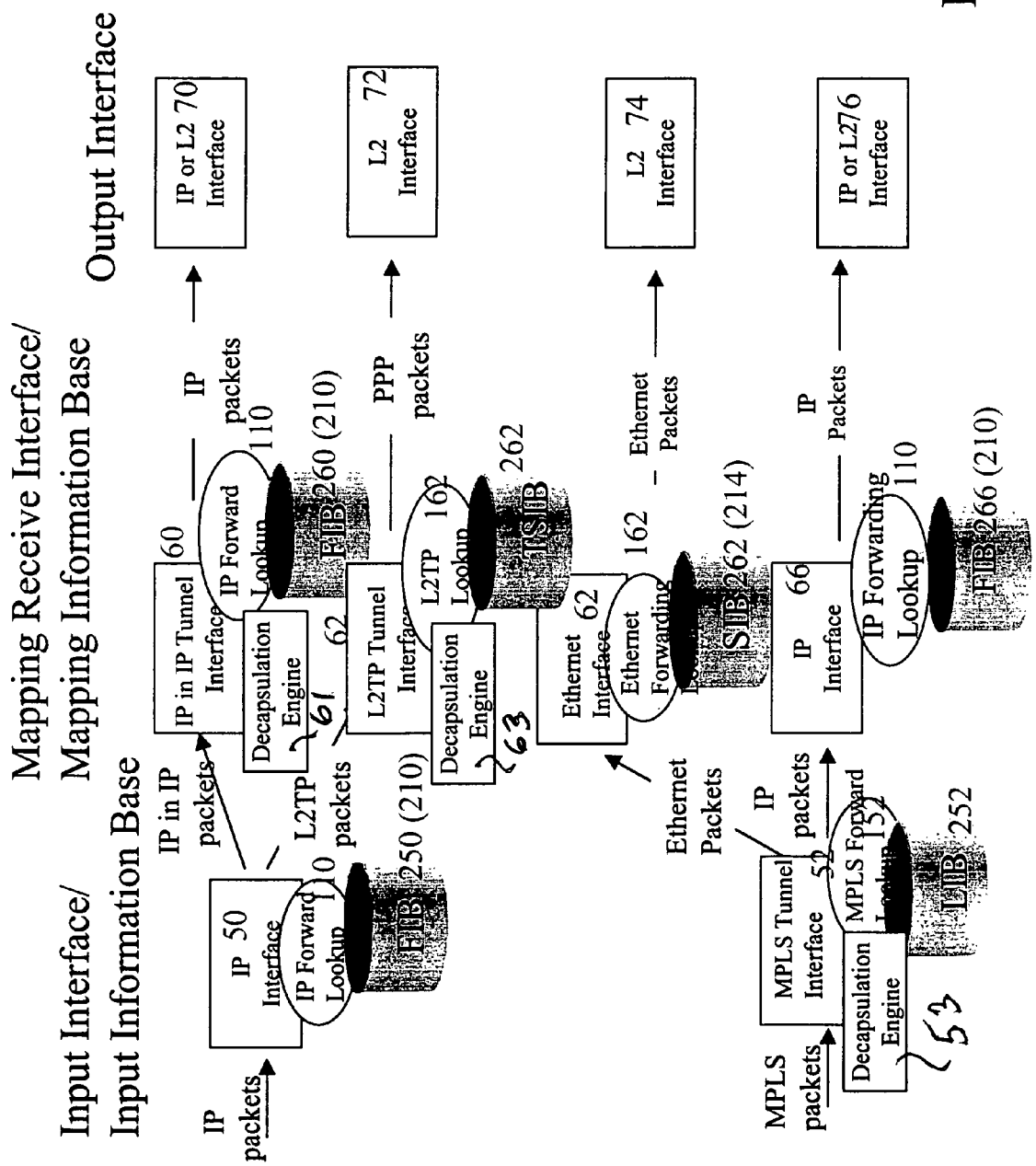
FIG. 3 is a high level schematic diagram illustrating tunnel termination processing according to the invention.

FIG. 3 illustrates tunnel termination processing according to the invention.

The input interface 50 is the terminus of all IP tunnels and L2TP tunnels. The IP forwarding lookup 110 uses the received packet header information to perform an IP lookup of the FIB 250 which yields the tunnel termination interface 60 or 62. If the packet exits the tunnel through the IP in IP tunnel interface 60, the IP tunnel header is dropped, exposing the inner IP header. The inner IP header is processed by the decapsulation engine 61. The Tunnel interface 60 is associated with its own FIB 260, or a single system FIB 210. A second IP lookup 110 is performed on this FIB, which yields an L3, or L2 output interface 70 on which the packet is forwarded In the case of L2TP tunnels, the IP forwarding lookup 110 searches the FIB 250 (if a separate FIB is provided or FIB 210 if a single FIB is shared with other lookup functions), which yields the L2TP tunnel termination interface 62, and an indication of the L2TP tunnel termination processing type. The IP header and UDP header are dropped by the decapsulation engine, exposing the L2TP header. Tunnel ID and Session ID information from this header is used to perform a second lookup 162, on the L2TP information data base 262 which yields the PPP output interface 72 to which the packet is forwarded.

The interface 52 is the terminus of all MPLS tunnels. The decapsulation engine 53 uses the incoming packet's label information to perform a first (MPLS) lookup 152 on the LIB 252 associated with the MPLS input interface 52. This yields one of the following:

a virtual connection (VC) ID, and its attached Ethernet interface 62, a virtual LAN ID, or a destination MAC address, and the attached Ethernet interface 62, or an IP interface 66.

For Ethernet over MPLS, after popping the MPLS label, the inner Ethernet header is exposed. The Ethernet interface 62 has an associated data base SIB 262 (or 214, if there is only one SIB in the system). The information from the Ethernet header is used for a second, Ethernet, lookup which is performed on this data base 262 or 214. This yields the output interface 74 to which the packet is forwarded.

For IP over MPLS tunnels, after popping the MPLS label, the inner IP header is exposed. The information in the IP header is used for a second, IP lookup 110. This is performed on the FIB 266 associated with the IP interface 66 (or 210 if there is only one FIB in the system) which points to L3 or L2 output interface 76.

From the foregoing, it will be appreciated that the methods described thus far enable the implementation of four different kinds of tunnels using similar data structures for each. FIG. 4 and FIG. 5 illustrate the corresponding data structures.

As shown in FIG. 4, for Tunnel Origination (Tunnel Entry) processing, the invention provides for each protocol an "input interface", an "input information database", a "mapping transmit interface", a "mapping information database", and an "output interface". The "mapping transmit interface" is the transmit side of the tunnel interface.

In the case of IP over IP tunnel origination, the input interface is an IP interface, the input information database is an FIB, the mapping transmit interface is an IP in IP transmit tunnel interface, the mapping information database is optional and may be an FIB, and the output interface is an IP or L2 interface.

In the case of L2TP tunnel origination, the input interface is a PPP interface, the input information database is a TSIB, the mapping transmit interface is an L2TP transmit tunnel interface, the mapping information database is optional and may be an FIB, and the output interface is an IP or L2 interface.

In the case of IP over MPLS tunnel origination, the input interface is an IP interface, the input information database is an FIB, the mapping transmit interface is an MPLS transmit tunnel interface, there is no mapping information database, and the output interface is an L2 interface.

In the case of Ethernet over MPLS tunnel origination, the input interface is an Ethernet interface, the input information database is an SIB, the mapping transmit interface is an MPLS transmit tunnel interface, there is no mapping information database, and the output interface is an L2 interface.

As shown in FIG. 5, for Tunnel Termination (Tunnel Exit) processing, the invention provides for each protocol an "input interface", an "input information database", a "mapping receive interface", a "mapping information database" and an "output interface". The "mapping receive interface" is the receive side of the tunnel interface.

In the case of IP over IP tunnel termination, the input interface is an IP interface, the input information database is an FIB, the mapping receive interface is an IP in IP receive tunnel interface, the mapping information database is an FIB, and the output interface is an IP or L2 interface.

In the case of L2TP tunnel termination, the input interface is an IP interface, the input information database is an FIB, the mapping receive interface is an L2TP receive tunnel interface, the mapping information database is a TSIB, and the output interface is a PPP interface.

In the case of IP over MPLS tunnel termination, the input interface is an MPLS interface, the input information database is an LIB, the mapping receive interface is an IP interface, the mapping information database is an FIB, and the output interface is an IP or L2 interface.

In the case of Ethernet over MPLS tunnel termination, the input interface is an MPLS interface, the input-information database is an LIB, the mapping receive interface is an Ethernet interface, the mapping information database is an SIB, and the output interface is an Ethernet interface.

According to the present implementation of the invention, tunnel interfaces are of two types. One type is referred to as a "transmit" interface, which is associated with entering the tunnel. The other is referred to as a "receive" tunnel interface, which is associated with exiting the tunnel. Each "end" of a tunnel will use at least a transmit tunnel interface (entry in tunnel), or a receive tunnel interface (exit from tunnel). Bidirectional tunnels will have both types of interface at each end.

The transmit tunnel interface is characterized by the following parameters: tunneling protocol, encapsulation header field values, such as local source address, remote destination address, hop limit, and tunnel MTU (for IP in IP, or L2TP), or MPLS output label(s), L2TP header fields.

According to the illustrated embodiment, four protocols are supported: IP in IP (where IP can be either IPv4 or IPv6), IP over MPLS, Ethernet over MPLS, and L2TP. For IP in IP (IPv4 and IPv6) and L2TP the local source address is the address of tunnel entry node, the remote destination address is the address of the tunnel exit node, and the hop limit is the number of hops or "time to live" set in the tunnel header. The tunnel MTU is the parent interface MTU less the tunnel header size.

The "receive" tunnel interface requires fewer parameters. The invention provides similar structuring of Tunnel Interfaces (receive interfaces and transmit interfaces) and similar logical linking between data structures used for input packet processing. The receive interface yields the structure used for IP lookup (FIB) or MPLS label mapping (LIB), or L2TP-Tunnel and Session ID mapping (TSIB)), and similar logical linking between data structures used for output packet processing. The transmit interface provides the information about the encapsulation of the packet, tunnel IF header source and destination addresses, or MPLS Labels, or L2TP IP source and destination addresses.

Turning now to the Appendix, the tunnel transmit interface is characterized by the following basic parameters:

Tunneling protocol—the tunneling protocol can be IPv4 in IPv4, IPv6 in IPv6, GRE, etc., . . .

Local source address—address of tunnel-entry node

Remote destination address—address of tunnel-exit node

Hop limit—the number of hops or time to live set in the tunnel header

Tunnel MTU—the parent interface MTU less the tunnel header size.

IPv4 tunnel interface attributes are illustrated at lines 82-95 of the Appendix and IPv6 tunnel interface attributes are illustrated at lines 96-113 of the Appendix. IPv4 source and destination address definitions are illustrated at lines 159-166 and IPv6 source and destination address definitions are illustrated at lines 167-174 of the Appendix. The function to set IP source and destination address is illustrated at lines 182-190 of the Appendix.

A tunnel interface for MPLS tunneling can be created only if a layer 2 interface exists, with at least one child layer 3 interface. For MPLS tunnels, the transmit interface holds the MPLS encapsulation information—label stack, and actions to be performed. The MPLS receive interface is associated with an LIB. It receives MPLS packets and helps locate the LIB used for Input Label Match. An MPLS tunnel interface is a logical interface on which MPLS packets are received and transmitted. MPLS tunnel interface attributes are illustrated at lines 114-128. A function to set MPLS tunnel label stacks on a set of interfaces is illustrated at lines 192-201.

L2TP tunnel interface attributes are illustrated at lines 133-148 of the Appendix. A function to set L2TP tunnel interface attributes is illustrated at lines 225-237.

A function to associate an information base with a tunnel interface is illustrated at lines 211-222 of the Appendix.

Error codes are illustrated at lines 239-294 of the Appendix.

There have been described and illustrated herein a uniform method for implementing multiple tunneling protocols. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

The invention claimed is:

1. A uniform method for implementing multiple tunneling protocols in a switch or router having a plurality of input interfaces and a plurality of output interfaces, comprising:

a) providing a finite set of tunnel interfaces, each tunnel interface characterized by a set of tunnel specific attributes, a first of said tunnel interfaces being associated with one tunneling protocol and a second of said tunnel interfaces being associated with a second tunneling protocol different from said first tunneling protocol;

b) mapping one of the input interfaces to one of said tunnel interfaces; and c) mapping said one of said tunnel interfaces to one of the output interfaces, whereby multiple tunneling protocols are implemented in a uniform way.

2. The method according to claim 1, wherein:

said tunnel specific attributes include parameters identifying tunnel end points.

3. The method according to claim 1, wherein:

said step of mapping one of the input interfaces to one of said tunnel interfaces is performed by using context data in an arriving packet as a first search key to a first database.

4. The method according to claim 3, wherein:

said arriving packet has a header and said context data is obtained from said header.

5. The method according to claim 4, further comprising:

d) processing said header with said one of said tunnel interfaces to obtain a new header, wherein said step of mapping said one of said tunnel interfaces to one of the output interfaces is performed by using the new header as a second search key to a second database.

6. The method according to claim 1, wherein:

both said step of mapping one of the input interfaces to one of said tunnel interfaces and said step of mapping said one of said tunnel interfaces to one of the output interfaces are performed by using context data in an arriving packet as a first search key to a first database.

7. The method according to claim 6, wherein:

said arriving packet has a header and said context data is obtained from said header.

8. The method according to claim 5, wherein:

the one of the output interfaces is one of an L2 (layer two) and an L3 (layer three) interface, and said step of using the new header as a second search key to a second database yields one of an L2 and an L3 interface.

9. A uniform method for implementing multiple tunneling protocols in a switch or router, comprising:

a) associating an input interface, an output interface, and an information database with each of said multiple tunneling protocols;

b) associating a mapping interface and a mapping information base with each of said multiple tunneling protocols; and c) uniformly implementing a tunneling protocol by selecting an input interface, an output interface, and an information database associated with the tunneling protocol to be implemented.

10. The method according to claim 9, wherein:

for IP over IP origination, the input interface is an IP interface, the output interface is one of an L2 interface and an IP interface, and the information database is a forwarding information base.

11. The method according to claim 9, wherein:

for IP over MPLS tunnel origination, the input interface is an IP interface, the output interface is an L2 interface, and the information database is a forwarding information base.

12. The method according to claim 9, wherein: for L2TP tunnel origination, the input interface is a PPP interface, the output interface is one of an L2 interface and an IP interface, and the information database is a tunnel and session information base.

13. The method according to claim 9, wherein:
for ETHERNET over MPLS (multiprotocol label switching) tunnel origination, the input interface is an ETHERNET interface, the output interface is an L2 (layer 2) interface, and the information database is a switching information base.

14. A uniform method for implementing multiple tunneling protocols in a switch or router having a plurality of input streams and a plurality of output streams, comprising:
   a) providing a finite set of tunnel interfaces, a first of said tunnel interfaces being associated with one tunneling protocol and a second of said tunnel interfaces being associated with a second tunneling protocol different from said first tunneling protocol; and
   b) mapping input streams and output streams to tunnel interfaces for different tunneling protocols in a uniform manner.

15. The method according to claim 14, wherein:
some of the input streams are L2 (layer two) streams and some of the input streams are L3 (layer 3) streams, said step of providing a finite set of tunnel interfaces includes providing a set of L2 tunnel interfaces for L2 input streams and a set of L3 tunnel interfaces for L3 input streams.

16. The method according to claim 15, wherein:
input streams are mapped to tunnel interfaces by a forwarding function.

17. The method according to claim 16, wherein:
the forwarding function performs mapping based on context data associated with input packets and database information which is configured and updated by a local host.

18. The method according to claim 15, wherein:
L2 input streams are mapped to L2 tunnel interfaces by a first forwarding function, and L3 input streams are mapped to L3 tunnel interfaces by a second forwarding function.

19. The method according to claim 18, wherein:
some of the output streams are L2 streams and some of the output streams are L3 streams, L2 tunnel interfaces are mapped to L2 output streams by a third forwarding function, and L3 tunnel interfaces are mapped to L3 output streams by a fourth forwarding function.

20. The method according to claim 19, wherein:
L2 tunnel interfaces are mapped to L3 output streams by a fifth forwarding function, and L3 tunnel interfaces are mapped to L2 output streams by a sixth forwarding function.

21. A uniform method for implementing multiple tunneling protocols in a switch or router, comprising:
providing a plurality of tunnel interfaces, a first of said tunnel interfaces being associated with one tunneling protocol and a second of said tunnel interfaces being associated with a second tunneling protocol different from said first tunneling protocol, each tunnel interface having a plurality of parameters which are described in a uniform way, said plurality of parameters including a local source address and a remote destination address.

22. The method according to claim 21, wherein:
said plurality of parameters includes a hop limit or time to live.

23. The method according to claim 22, wherein:
said plurality of parameters includes a tunnel MTU (maximum transmission unit).

24. The method according to claim 22, further comprising:
providing a hop function to set the hop limit for a tunnel interface.

25. The method according to claim 21, further comprising:
providing a plurality of tunnel entry node structures and a plurality of tunnel exit node structures.

26. The method according to claim 21, farther comprising:
providing an address function to set tunnel interface source and destination addresses.

27. The method according to claim 26, further comprising:
providing a first address function for IPv4 (internet protocol version four) interfaces and a second address function for IPv6 (internet protocol version six) interfaces.

28. The method according to claim 21, wherein:
said plurality of parameters includes MPLS (multiprotocol label switching) encapsulation information and actions to be performed on MPLS packets.

29. The method according to claim 28, further comprising:
providing an MPLS function to associate an MPLS LIB (label information base) with an MPLS interface.

30. An application programming interface (API) for implementing a plurality of different tunneling protocols in a switch or router, said API comprising:
   a) a tunneling interface data structure having a plurality of parameters; and
   b) a plurality of functions for setting the parameters of the tunneling interface data structure, wherein
   a tunneling interface data structure is configurable to implement any one of said plurality of different tunneling protocols by using at least some of said plurality of functions.

31. The API according to claim 30, wherein:
said plurality of parameters including a local source address and a remote destination address.

32. The API according to claim 31, wherein:
said plurality of parameters includes a hop limit or time to live.

33. The API according to claim 32, wherein:
said plurality of parameters includes a tunnel MTU (maximum transmission unit).

34. The API according to claim 32, wherein:
said plurality of functions includes a hop function to set the hop limit for a tunnel interface.

35. The API according to claim 30, further comprising:
c) a plurality of tunnel entry node structures; and
d) a plurality of tunnel exit node structures.

36. The API according to claim 30, wherein:
said plurality of functions includes an address function to set tunnel interface source and destination addresses.

37. The API according to claim 36, wherein:
said plurality of functions includes a first address function for IPv4 (internet protocol version four) interfaces and a second address function for IPv6 (internet protocol version six) interfaces.

38. The API according to claim 30, wherein:
said plurality of parameters includes MPLS (multiprotocol label switching) encapsulation information and actions to be performed on MPLS packets.

39. The API according to claim 38, wherein:
said plurality of functions includes an MPLS function to associate an MPLS LIB (label information base) with an MPLS interface.

* * * * *